United States Patent
Lattner et al.

(10) Patent No.: US 10,427,236 B2
(45) Date of Patent: Oct. 1, 2019

(54) BURNER FOR A WELDING APPARATUS

(71) Applicant: FRONIUS INTERNATIONAL GmbH, Pettenbach (AT)

(72) Inventors: Peter Lattner, Kematen (AT); Uwe Kroiss, Wilhering (AT); Wolfgang Kruglhuber, Hohenzell (AT); Thomas Rauch, Steinbach am Ziehberg (AT)

(73) Assignee: FRONIUS INTERNATIONAL GmbH, Pettenbach (AT)

( * ) Notice: Subject to any disclaimer, the term of this patent is extended or adjusted under 35 U.S.C. 154(b) by 561 days.

(21) Appl. No.: 14/978,431

(22) Filed: Dec. 22, 2015

(65) Prior Publication Data
US 2016/0175975 A1    Jun. 23, 2016

(30) Foreign Application Priority Data

Dec. 23, 2014 (AT) .............................. A 50940/2014

(51) Int. Cl.
| | |
|---|---|
| *B23K 9/12* | (2006.01) |
| *B23K 9/067* | (2006.01) |
| *B23K 9/095* | (2006.01) |
| *B23K 9/28* | (2006.01) |
| *B23K 9/167* | (2006.01) |

(52) U.S. Cl.
CPC .............. *B23K 9/067* (2013.01); *B23K 9/124* (2013.01); *B23K 9/167* (2013.01)

(58) Field of Classification Search
None
See application file for complete search history.

(56) References Cited

U.S. PATENT DOCUMENTS

| | | | | |
|---|---|---|---|---|
| 3,829,652 A | * | 8/1974 | Terry ................... | B23K 9/1012 219/133 |
| 3,940,586 A | * | 2/1976 | Stearns ................. | B23K 9/133 219/75 |
| 4,174,477 A | * | 11/1979 | Essers .................... | B23K 10/02 219/121.46 |
| 4,205,215 A | * | 5/1980 | Willems ................. | B23K 10/02 219/121.36 |
| 4,220,844 A | * | 9/1980 | Essers ................... | B23K 35/383 219/121.36 |

(Continued)

FOREIGN PATENT DOCUMENTS

| | | |
|---|---|---|
| JP | S605481 | 1/1985 |
| JP | H0847775 | 2/1996 |

(Continued)

OTHER PUBLICATIONS

Austrian Search Report conducted in counterpart Austria Appln. No. A 50940/2014 (dated Oct. 12, 2015).

*Primary Examiner* — Ibrahime A Abraham
*Assistant Examiner* — Gyounghyun Bae
(74) *Attorney, Agent, or Firm* — Greenblum & Bernstein, P.L.C.

(57) ABSTRACT

Burner for a welding apparatus having a non-melting electrode, a wire feed device for a welding wire and a power feed device for introducing an electric heating current into the welding wire that is supplied. The wire feed device can be activated in two directions of advance and an electric voltage applied by the power feed device to the welding wire can be regulated to ignite an igniting arc between the tip of the welding wire and the workpiece.

7 Claims, 4 Drawing Sheets

(56) References Cited

U.S. PATENT DOCUMENTS

Figure 1:
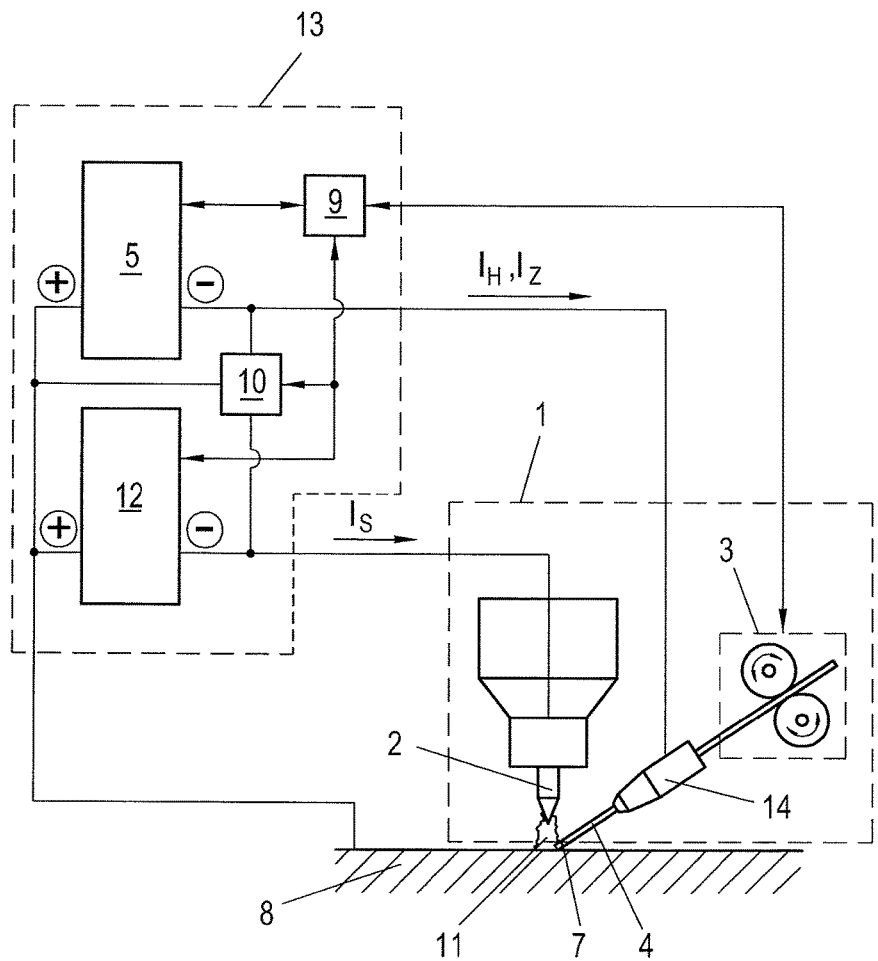

| Patent | Date | Inventor | Class |
|---|---|---|---|
| 4,233,489 A * | 11/1980 | Essers | B23K 9/167 219/121.36 |
| 4,441,012 A * | 4/1984 | Risbeck | B23K 9/124 219/130.51 |
| 4,767,907 A * | 8/1988 | Otani | B23K 9/0678 219/121.52 |
| 4,780,594 A * | 10/1988 | Rothermel | B23K 9/124 219/136 |
| 5,148,001 A * | 9/1992 | Stava | B23K 9/0732 219/130.1 |
| 5,714,735 A * | 2/1998 | Offer | B23K 9/1093 219/136 |
| 5,994,659 A * | 11/1999 | Offer | B23K 9/1093 219/136 |
| 6,034,350 A * | 3/2000 | Heraly | B23K 9/1056 219/130.31 |
| 6,423,937 B1 * | 7/2002 | Karlsson | B23K 9/0672 219/130.4 |
| 6,548,784 B2 * | 4/2003 | Sammons | B23K 9/1056 219/130.21 |
| 6,570,131 B1 * | 5/2003 | Stava | B23K 9/0671 219/130.33 |
| 7,102,099 B2 * | 9/2006 | Huismann | B23K 9/073 219/130.51 |
| 7,638,734 B2 * | 12/2009 | Prinz | B23K 9/093 219/121.57 |
| 8,389,900 B2 * | 3/2013 | Artelsmair | B23K 9/0737 219/137 PS |
| 8,993,925 B2 * | 3/2015 | Fujiwara | B23K 9/09 219/130.33 |
| 9,035,220 B2 * | 5/2015 | Schorghuber | B23K 9/124 219/136 |
| 9,050,677 B2 * | 6/2015 | Kawamoto | B23K 9/067 |
| 2002/0117489 A1 | 8/2002 | Arndt et al. | |
| 2003/0080101 A1 * | 5/2003 | Flood | B23K 9/1062 219/130.21 |

FOREIGN PATENT DOCUMENTS

| | | |
|---|---|---|
| JP | 2005-349405 | 12/2005 |
| WO | 2010/082081 | 7/2010 |

* cited by examiner

BURNER FOR A WELDING APPARATUS

CROSS-REFERENCE TO RELATED APPLICATIONS

The present application claims the right of priority granted under 35 U.S.C. § 119 of Austrian Application No. A50940/2014 filed on Dec. 23, 2014, the discloure of which is herein expressly incorporated by reference in its entirety.

The invention relates to a burner for a welding apparatus having a non-melting electrode, a wire feed mechanism for a welding wire and a power feed device for feeding an electric heating current into the welding wire at a side as well as a welding method using a non-melting electrode and a welding wire as an filler material.

Devices for TIG welding (tungsten inert gas welding) have a burner head with a non-melting electrode of a tungsten material, wherein an electric arc is produced (primary electric arc) between the electrode and the workpiece and is protected by a protective gas (inert gas) from contact with atmospheric gases. In TIG welding, it is possible to work either with or without a filler material. When using a filler material, it is usually advanced steadily as a rod or a wire by hand or by means of an advancing drive into the molten bath formed by the primary electric arc while the burner is moved forward along the welding seam and forms a welding bead.

In the so-called hot wire method, the welding wire that is supplied is heated in the region of the tip of the burner, which leads to a higher-quality weld due to the improved melting behavior of the filler material. The welding wire is heated by means of a power feed device in the burner. As long as a short circuit is established between the workpiece and the tip of the welding wire, the heating current introduced via the power input device flows through the forward end of the welding wire and heats it by ohmic heating. In doing so, the heating current can flow only as long as the tip of the welding wire is short-circuited with the workpiece either directly or by way of the welding bath. However, if the welding wire is heated too much, it may happen that the tip of the welding wire melts too quickly and a drop falls off so that the short circuit is interrupted. Due to the sudden increase in resistance, the voltage in the welding wire may increase greatly and an electric arc (also referred to as an "arc fault") is formed between the new tip of the welding wire and the workpiece. This is highly undesirable because, on the one hand, the arc fault also has a negative effect on the quality of the weld and, on the other hand, can also influence the course of the primary electric arc, which is referred to as "arc blow" and also has a negative effect on the quality of the weld.

To prevent the tip of the welding wire from dripping off and to prevent arc blow, US 2002/0117489 proposes that the rate of advance of the welding wire be coordinated with the heating current flow and that a voltage limiter be provided to prevent the development of an arc fault.

Another problem with TIG welding relates to ignition of the arc between the non-melting electrode and the material (this arc is referred to as the "primary arc" in conjunction with the present description). The primary arc is usually ignited with a high voltage pulse, which may cause interference in the electronic control system of robots and/or automated systems. In the so-called lift arc, the workpiece is contacted briefly by the electrode for ignition of the arc, and then the electrode is pulled back a distance. However, a lift arc cannot generally be used with automated applications for TIG welding.

WO 2010/082081 A1 discloses a method for igniting a primary arc, wherein the welding wire is advanced up to the workpiece prior to ignition, contact is detected by the voltage drop in the measuring voltage, then the measuring voltage is powered off, the welding wire is preheated with the heating current and then the primary arc is ignited in the traditional manner.

Among other things, the present invention is based on the object of improving upon the welding method defined in the introduction and overcoming the disadvantages of the prior art. In addition, another goal of the present invention is to create a burner of the type defined in the introduction with which the method according to the invention can be carried out advantageously.

According to the invention, the object is achieved by a burner of the type defined in the introduction, with which the wire feed mechanism can be operated in two directions of advance and in which an electric voltage applied by the power feed device to the welding wire for igniting an igniting arc between the tip of the welding wire and the workpiece. With this burner, it is possible to ignite an igniting arc between the tip of the welding wire and the workpiece by contacting the workpiece with the tip of the welding wire, igniting an ignition current and retracting the welding wire. The igniting arc ionizes the region between the non-melting electrode and the workpiece, so that the primary arc can be ignited without the high-voltage pulse or with a substantially lower voltage than was previously necessary.

A measuring unit can advantageously be provided for monitoring the voltage applied to the welding wire. This measuring unit allows detection of whether a short circuit has been established between the welding wire and the workpiece.

In another advantageous embodiment of the invention, the power feed device may have a regulating device for regulating the current flow in the welding wire. The ignition and the heating current can be by means of the regulating device regulated during ignition as well as during the welding process.

In a preferred embodiment, the wire feed mechanism may be controllable in the feed of welding wire during the welding in a pilger step forward movement. Due to the alternating high dynamic back-and-forth movement of the tip of the welding wire, the latter is alternately advanced into the welding bath and then retracted back out of it. In doing so, the welding bath is "restirred" in each step and/or is set in vibration, wherein a particularly regular welding bead is formed. This highly dynamic movement has, among other things, an influence on flow behavior, scaling, melting results, etc. Therefore, many factors can be influenced and adapted optimally to the different applications.

In an advantageous embodiment, the regulating device can preferably coordinate the current flow introduced with the power feed device with the pilger step feed movement. Therefore, unwanted arc blow effects or arc faults are prevented, while efficient preheating of the welding wire can be ensured.

The regulating device can advantageously take into account a short-circuit signal detected by the measuring unit in coordinating the current flow. This allows high precision automated coordination of the current regulation with the sequence of short-circuit phases.

The advantages according to the invention are additionally achieved by a welding method which has the following steps for ignition of a primary arc between a non-melting electrode of a burner of a welding apparatus and a workpiece: establishing a short circuit between the tip of the welding wire and the workpiece, adjusting an ignition current in the welding wire, lifting the welding wire away from the workpiece for ignition of an igniting arc between the tip of the welding wire and the workpiece and igniting the primary arc in the region ionized by the igniting arc.

For detection of the short circuit between the welding wire and the workpiece, a measuring voltage can advantageously be applied to the welding wire. The forward movement can be regulated easily in this way.

The welding wire can be preheated advantageously by a heating current before adjusting the ignition current, thereby ensuring a uniform development of the welding bead from the beginning.

The welding wire can be lifted in various ways, for example, by a movement running across or obliquely to the axis of the wire, a pivoting movement of the welding wire or a combination thereof. The lifting of the welding wire may preferably be combined with a reverse movement of the welding wire. It is therefore not necessary to have a separate pivoting or lifting device because the lifting movement can be accomplished by the wire feed mechanism.

After igniting the primary arc, the welding wire can be supplied in a reciprocal forward movement, wherein the welding bath is induced to movement and/or vibrating by the tip of the welding wire. Therefore, a particularly uniform and high quality welding bead can be formed.

The heating current can advantageously be activated and deactivated with the pilger step feed movement, so that arc blow effects and arc faults are prevented.

In a preferred embodiment changes in the parameters for forward times and/or reverse times and/or forward speeds and/or the heating current during the pilger step feed movement can be regulated on the basis of a measurement of the start and stop of a short circuit between the tip of the welding wire and the workpiece. This reduces the number of parameters to be adjusted by the operating person.

The present invention is explained in greater detail below with reference to FIGS. 1 through 4, which show advantageous embodiments of the invention schematically and without restriction as examples.

Figure 2:
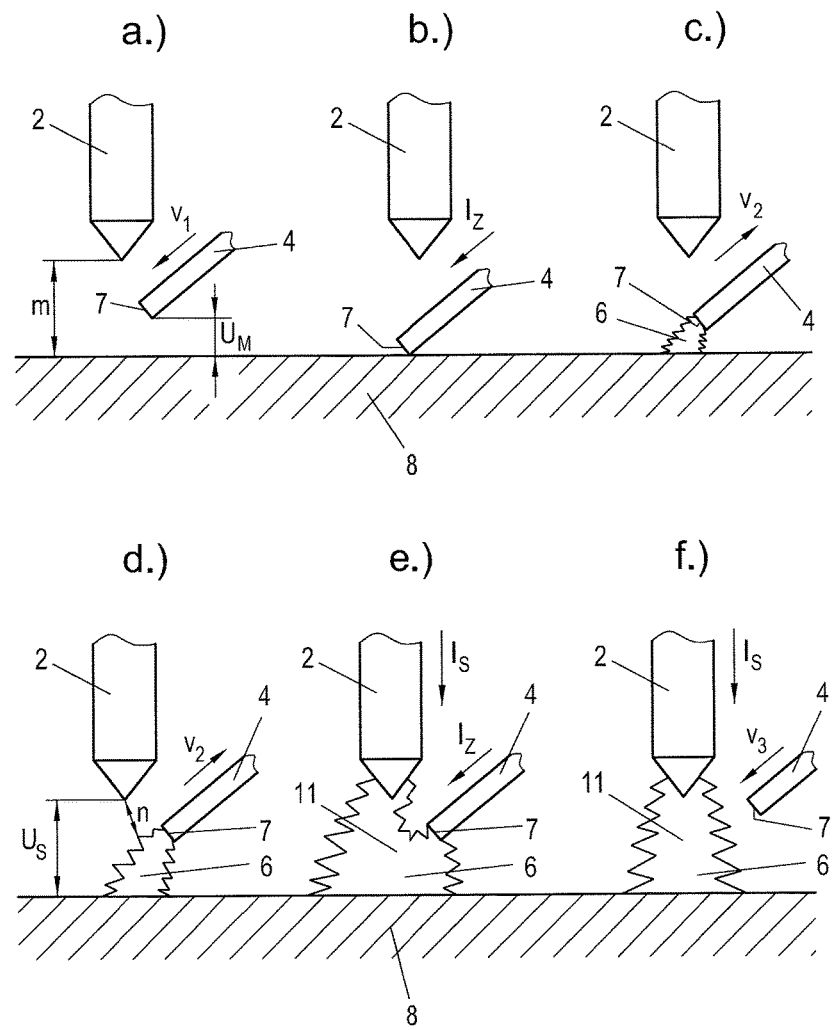
Figure 3:
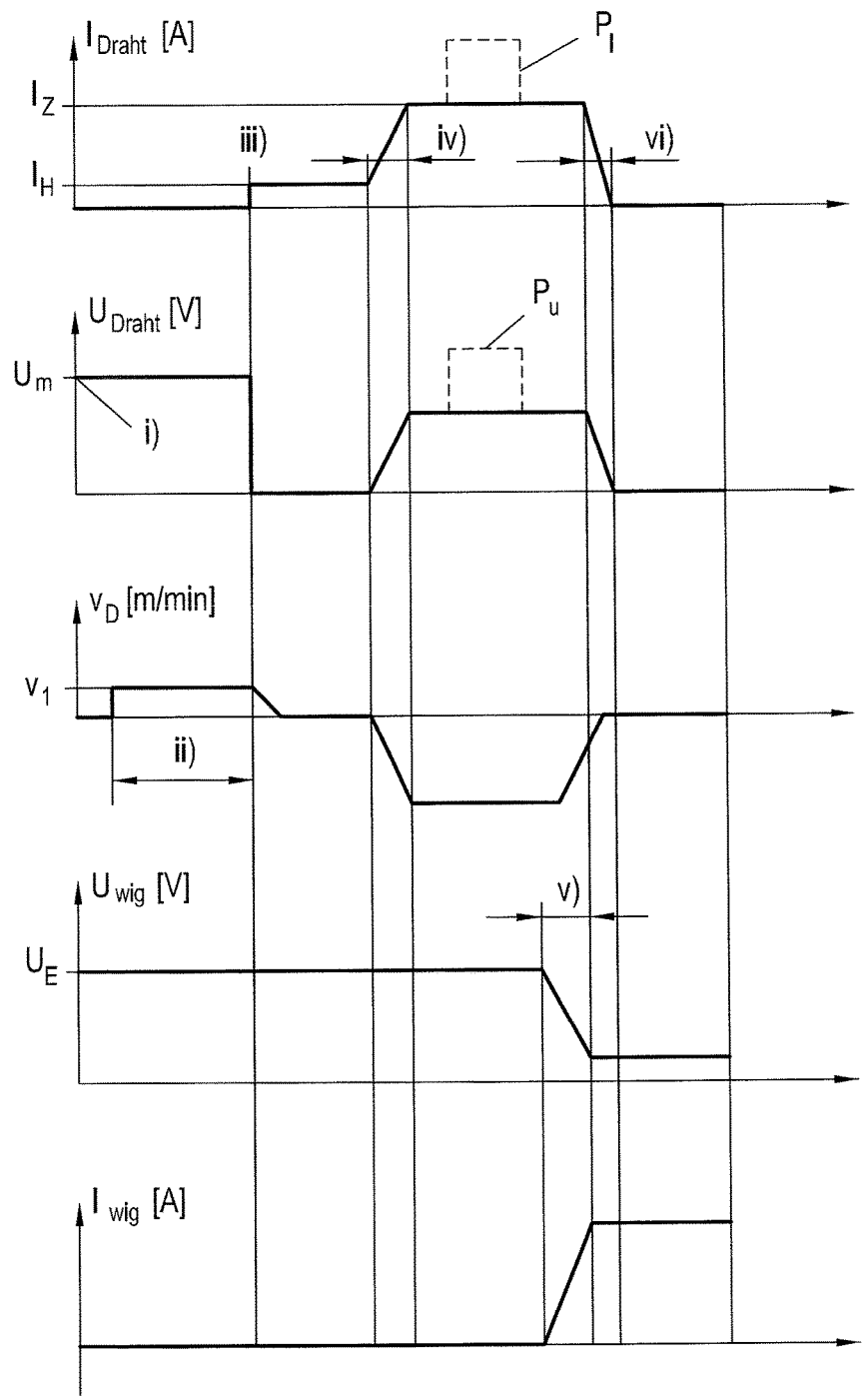
Figure 4:
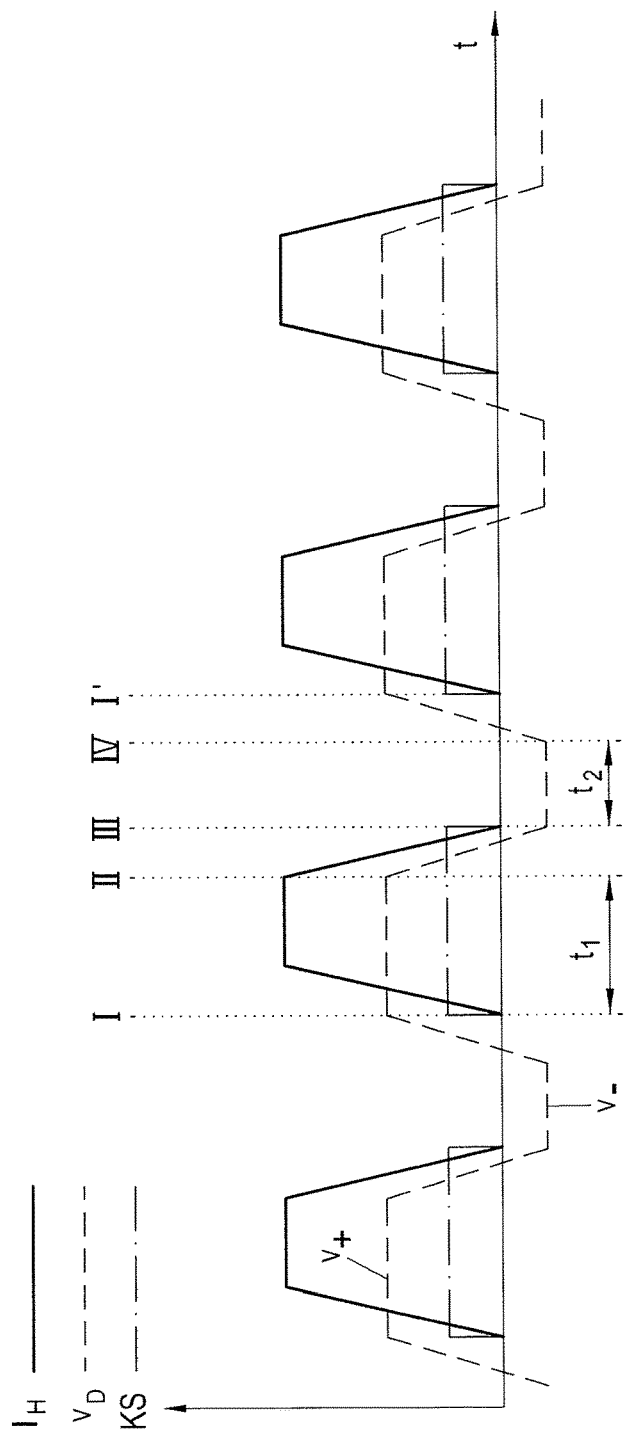

FIG. 1 shows a schematic overview of the elements of a welding apparatus with which the invention is implemented, FIG. 2 shows a schematic diagram of the ignition process carried out with the burner according to the invention, FIG. 3 shows a diagram of the current and voltage curves in ignition of the primary arc and FIG. 4 shows a diagram of the pilger step feed movement and the heating current thereby introduced into the welding wire.

FIG. 1 shows the essential elements of welding apparatus for the description of the invention wherein the burner 1 and the electric unit 13 are generally represented as structurally separate units. The burner 1 has a non-melting electrode 2, usually made of tungsten, and a wire feed mechanism 3 for a welding wire 4. As shown by the arrows representing rotation, the wire feed mechanism 3 can convey the welding wire 4 in both directions, i.e., forward (in the direction of the tip 7 of the welding wire) and in reverse (in the opposite direction). The welding wire supply is usually unwound from a reel (not shown) in the usual way by the wire feed mechanism 3. Alternatively, the welding wire can be supplied in the form of a rod by hand. The welding wire advances from a welding wire feed 14 to the non-melting electrode, wherein an adequate distance is provided between the welding wire feed 14 and the workpiece to prevent the welding wire feed 14 from entering the region of a primary arc 11 between the non-melting electrode and a workpiece 8.

To ensure a uniform and rapid melting of the tip 7 of the welding wire, the region of the welding wire 4 between the welding wire feed 14 and the tip 7 of the welding wire has a heating current $I_H$ flowing through it, preheating the welding wire by ohmic heating. The heating current $I_H$ is introduced into the welding wire 4 in the region of the welding wire feed 14 wherein the current flow is ensured only as long as there is a short circuit between the tip 7 of the welding wire and the workpiece 8 (either through direct contact or via the welding bath). As explained in greater detail below, an ignition current $I_Z$ can also be introduced into the welding wire 4 via the welding wire feed 14.

The electric unit 13 has a power feed device 5, a welding current source 12, a regulating device 9 and a measuring unit 10. The welding wire feed 14 is connected to the negative terminal of the power feed device 5 and is supplied with the heating current $I_H$ and/or the ignition current $I_Z$ by means of this terminal. The negative terminal of the welding current source 12 is connected to the non-melting electrode 2 and supplies it with the welding current $I_S$ required for maintaining the primary arc 11. In this case, the positive terminals of the power feed device 5 and the welding current source 9 are connected to the workpiece 8. Similarly the terminals can also be reversed. A measuring unit 10 measures the voltage applied to the welding wire feed 14, wherein a voltage drop characterizes a short circuit between the welding wire 4 and the workpiece 8, and a rise in current is characteristic of an interruption in the short circuit. Furthermore, the measuring unit 10 can also measure the voltage applied to the non-melting electrode, for example, to monitor the ignition and the integrity of the primary arc 11.

A regulating unit 9 serves to control and coordinate the individual elements of the welding apparatus. The regulating unit 9 controls the power feed device 5 and the welding current source 12. In addition, the regulating unit 9 controls the drive of the wire feed device 3 and coordinates this with the power feed device 5 and with the welding current source 12. The regulating methods implemented by the regulating unit 9 are adequately well-known in the professional field and will be described in the present document only to the extent that they directly relate to the present invention. For reasons of simplicity, the components for supplying the inert gas to the non-melting electrode 2 have been omitted from the figures because those skilled in the art are familiar with these elements.

In an alternative embodiment, the wire feed device 3 can also be arranged in the electric unit 13 and/or in the welding current source 12. A tube bundle, which is known from the prior art and in which all media are carried can be used as the connection to the burner.

FIG. 2 is described in the following explanation with simultaneous reference back to FIG. 1, showing, consecutively, various states a) through f), which are to be run through for igniting the primary arc 11 according to the invention. State a) represents the situation immediately prior to ignition, wherein the distance m between the non-melting electrode 2 and the workpiece 8 is not sufficient to readily ignite a primary arc 11 with the voltage applied by the welding current source 12 to the non-melting electrode 2. Then a measuring voltage $U_M$ is applied to the welding wire 4 by means of the power feed device 5 described previously, and the wire feed mechanism 3 conveys the welding wire 4 in a fourth movement at the rate $v_1$. As soon as the tip 7 of the welding wire touches the workpiece 8, the measuring unit 10 detects a sudden voltage drop, whereupon the wire feed device 3 is stopped and a short circuit is established between the welding wire 4 and the workpiece 8 as shown in state b). In this state b), an ignition current $I_Z$ is now fed into the welding wire by the power feed device 5 via the welding wire guide 14, and the welding wire 4 is moved backwards at a rate $v_2$, whereupon an igniting arc 6 is formed when the tip 7 of the welding wire is lifted up from the workpiece 8 represented in state c). Before ignition of the igniting arc 6, the welding wire may optionally be preheated with a heating current.

In alternative embodiments, the welding wire can also be raised by a movement guided transversely or obliquely to the axis of the welding wire or by a pivoting movement, for example, with the help of a device (not shown) with which the welding wire guide 14 can be pivoted or moved laterally. This would be advantageous in particular in applications in which the welding wire feed is in a shallow angle to the surface of the workpiece 8 and simply move the tip 7 of the welding wire backwards with the wire feed device 3 would not guide the igniting arc 6 close enough to the tip of the non-melting electrode 2.

In FIG. 2, the igniting arc 6 is lengthened (state d) by moving the tip 7 of the welding wire back further until the distance n between the region ionized by the igniting arc 6 and the tip of the non-melting electrode 2 is so small that the primary arc 11 between the non-melting electrode 2 and the workpiece 8 is ignited merely because of a no-load voltage $U_S$ applied to the non-melting electrode 2, as represented in state e), while the igniting arc 6 is maintained at the same time. Ignition of the primary arc 11 can be detected by the measuring unit 10 based on the voltage drop associated with this, so that the regulating device 9 switches off the ignition current $I_Z$ when the primary arc 11 is burning under stable conditions, so that the igniting arc 6 is extinguished, as represented in state f). For welding, the welding wire 4 is then advanced at the rate of advance $v_3$, which is standard in welding, to the workpiece 8 and into the region that is melted by the primary arc 11 and is resupplied, so that enough material is supplied for forming a welding bead.

FIG. 3 shows the exemplary schematic curves of the following parameters during the ignition process described above:

$I_{wire}$ current characteristic in the welding wire
$U_{wire}$ voltage characteristic in the welding wire
$v_D$ rate of advance of the welding wire
$U_{TIG}$ voltage characteristic in the non-melting electrode
$I_{TIG}$ current characteristic in the non-melting electrode At the start of the ignition process, which is labeled as i), a voltage $U_M$ is applied to the welding wire 4 and a voltage $U_E$ is applied to the non-melting electrode 2. Then, in the region labeled as ii), the welding wire is moved forward at the rate $v_1$ until a short circuit is detected at point iii), based on the drop in voltage $U_{wire}$, i.e., the tip 7 of the welding wire has come in contact with the workpiece 8. The forward movement of the welding wire 4 is stopped and a heating current $I_H$ is introduced into the welding wire to preheat it.

For igniting the igniting arc, the current $I_{wire}$ is ramped up to an ignition current $I_Z$ in the welding wire 4 in the region iv), and the welding wire 4 is retracted via the wire feed device 3, so that the tip 7 of the welding wire is lifted up from the workpiece 8 and the igniting arc 6 is ignited. Ignition of the igniting arc 6 is thus recognizable by the associated rise in the voltage $U_{wire}$ in the welding wire. The welding wire is then moved backward further, while the igniting arc 6 is burning, until the primary arc 11 is ignited. This is recognizable due to the voltage drop thereby triggered in the voltage $U_{TIG}$ in the non-melting electrode 2 (this corresponds to the region v) in FIG. 3). The required igniting current $I_{TIG}$ for the primary arc 11 is thus also made available accordingly.

Then the wire feed device 3 stops the welding wire 4 and the ignition current $I_Z$ is maintained in the welding wire until the primary arc 11 has reached a stable burning state. The primary arc 11 and the igniting arc 6 burn simultaneously in this region. Then at vi), the current in the welding wire 4 is turned off as soon as amperage required for the primary arc 11 has been reached, so that the igniting arc 6 goes out while the primary arc 11 continues to burn in a stable manner.

The current $I_{wire}$ and/or the voltage $U_{wire}$ may also contain at least one pulse $P_i$, $P_u$ for ignition of the igniting arc 6 in their curves. Therefore, in comparison with a constant curve, this achieves the result that the ignition takes place more rapidly due to the increased energy input.

In addition, devices may also be provided to alter the angle of approach, the height, the position, etc. of the wire. This ensures that the igniting arc 6 will burn in the immediate vicinity of the non-melting electrode 2 and the segment for ignition of the primary arc 11 is ionized accordingly. For example, in an application in which the wire is supplied at a very shallow angle, the igniting arc 6 would also run with a very shallow curve and would therefore burn at a greater distance from the non-melting electrode 2. If the tip 7 of the welding wire is moved in the direction of the non-melting electrode 2 for the purpose of ignition, the igniting arc 6 is also brought closer to the non-melting electrode 2. For the subsequent welding operation, the tip 7 of the welding wire can be moved back from the altered position to the original position.

The state at the end of the diagram in FIG. 3 corresponds essentially to the state f) in FIG. 2. For the example of an ignition method illustrated in FIG. 2, approximately 20 to 50 ms, for example, 30 ms, usually elapses between the start of the ignition process (point i) and stable burning of the primary arc 11 (point ix), where the respective value depends in particular on the distance between the tungsten electrode and the workpiece.

After igniting of the primary arc 11, the welding process can be controlled in the traditional manner by the fact that the wire feed device 3 supplies the required amount of welding wire 4 into the welding bath, while the welding wire 4 is acted upon by a heating current $I_H$ for preheating it.

The wire feed device 3 permits a rapid dynamic change between a forward movement and a reverse movement so that the ignition can be carried out fast enough. However, this feature may also be used advantageously during the welding process to have an advantageous influence on the quality of the weld. The method used for this purpose is explained in greater detail in conjunction with FIG. 4, where the welding wire 4 is supplied in a pilger step feed movement, such that the tip 7 of the welding wire emerges from the welding bath with each reverse movement and therefore stops the short circuit between the workpiece 8 and the welding wire 4.

FIG. 4 shows this curve of heating current $I_H$, rate of advance $v_D$ and short circuit KS in the form of a diagram. In the pilger step feed movement, the wire is alternately advanced at the rate $v_+$ in a positive direction of advance and then is retracted in a negative direction of advance at a rate $v_-$. As shown in FIG. 4 the absolute value of the rate $v_+$ is higher than the absolute value of the rate $v_-$ so that the welding wire will have been conveyed further by a distance after each cycle of back-and-forth movement. The duration of the forward movement is also longer than the duration of the reverse movement, which reinforces the effect. The durations and rates are adjusted by the regulating device 9, so that the amount of filler material required to form the welding bead is always supplied.

With each forward movement the tip of the welding wire dips into the melt bath, changes the direction of advance and then comes out of the melt bath again, so that the melt bath is thus induced to vibrate. This vibration, which always takes place in similar increments, ensures a very uniform and high-quality weld.

With each forward movement, a short circuit is created when the tip 7 of the welding wire is immersed in the melt bath and the short circuit is stopped in retraction when the tip 7 of the welding wire emerges from the melt bath again. The short-circuit phases are characterized by the short-circuit signal KS in FIG. 4. Each time a short circuit is established and extinguished can be determined accurately by the measuring unit 10 on the basis of the associated changes in voltage. The short-circuit signal KS determined by the measuring unit 10 can be used to regulate the rate of advance to introduce a heating current $I_H$, which is coordinated with the short-circuit phase, as can be seen in FIG. 4.

As soon as the tip 7 of the welding wire penetrates into the welding bath and a short circuit is detected (at point I), the heating current $I_H$ is ramped up to a preset maximum value, wherein the welding wire is advanced at a constant rate of advance $v_+$. After an advance time $t_1$ (beginning at point II), the rate of advance is reduced continuously and then reverses until extinguishing of the short circuit (at point III) is detected. Then the reverse rate for a retraction time $t_2$ (up to point IV) remains unchanged, whereupon this constant rate corresponds to the maximum retraction rate $v_-$. In parallel with the change in the rate of advance (i.e., between point II and point III), the heating current $I_H$ is ramped down in a regulated manner, so that when the short circuit is extinguished (point III), a very low heating current $I_H$ or none at all is flowing, so that no arc faults and/or no welding splashes are formed. At the same time, the regulating device 9 ensures that at least a measuring voltage is applied to the welding wire at all times, so that the changes in the short circuit can be detected at all times. After the retraction time $t_2$ has elapsed, the rate of advance is again ramped down until the short-circuit signal is detected and the next cycle begins again (at point I'). This method can be regulated by means of only a few parameters to be adjusted in that the maximum rates are each adjusted by establishing and/or extinguishing the short circuit.

LIST OF REFERENCE NUMERALS

Burner (1)
Non-melting electrode (2)
Wire feed device (3)
Welding wire (4)
Power feed device (5)
Igniting arc (6)
Tip (7) of the welding wire
Workpiece (8)
Regulating device (9)
Measuring unit (10)
Primary arc (11)
Welding current source (12)
Electric unit (13)
Welding wire guide (14)

The invention claimed is:

1. A welding method using a non-melting electrode and a welding wire as the filler material for igniting a primary arc between the non-melting electrode of a burner of a welding apparatus and a workpiece, the method comprising:
   establishing a short circuit between a tip of the welding wire and the workpiece;
   supplying the non-melting electrode with a welding current for maintaining the primary arc;
   adjusting an igniting current in the welding wire;
   lifting the welding wire away from the workpiece to ignite an igniting arc between the workpiece and the tip of the welding wire lifted from the workpiece; and
   igniting, via the igniting arc, the primary arc in a region ionized by the igniting arc between the non-melting electrode and the workpiece.

2. The welding method according to claim 1, further comprising applying a measuring voltage to the welding wire to detect the short circuit between the tip of the welding wire and the workpiece.

3. The welding method according to claim 1, further comprising preheating the welding wire with a heating current before adjusting the igniting current.

4. The welding method according to claim 1, wherein the lifting occurs with a reverse movement of the welding wire.

5. The welding method according to claim 1, wherein after ignition of the primary arc, the method further comprises supplying the welding wire in a pilger step feed movement.

6. The welding method according to claim 5, wherein a heating current supplied to the welding wire is activated and deactivated in coordination with the pilger step feed movement.

7. The welding method according to claim 5, further comprising regulating changes in parameters for advance times and/or retraction times and/or advance rates and/or heating current during the pilger step feed movement on a basis of a measurement of a start and stop of the short circuit between the tip of the welding wire and the workpiece.

* * * * *